United States Patent
Tsuruta

[11] 3,765,466
[45] Oct. 16, 1973

[54] CONTROLLING METHOD IN A TRANSPORTING MACHINE SUCH AS AIRPLANE, AUTOMOBILE, ETC. AND ITS SYSTEM

[76] Inventor: Yasuo Tsuruta, 12-22, 3-chome, Nakamagome, Ota-ku, Tokyo, Japan

[22] Filed: Sept. 23, 1971

[21] Appl. No.: 183,039

[30] Foreign Application Priority Data
May 1, 1971    Japan.......................... 46/29171

[52] U.S. Cl................................. 152/210, 280/64
[51] Int. Cl............................................ B60c 11/14
[58] Field of Search.......................... 152/209, 210; 301/44 R, 44 T, 40 S; 280/64, 96.2 B

[56] References Cited
UNITED STATES PATENTS

| | | | |
|---|---|---|---|
| 3,001,601 | 9/1961 | Aghnides | 280/64 |
| 2,888,057 | 5/1959 | Hildebrant | 152/210 |
| 2,672,597 | 3/1954 | Ritch, Jr. | 280/96.2 B |
| 2,235,375 | 3/1941 | Kraft | 152/210 |

Primary Examiner—James B. Marbert
Attorney—Steinberg & Blake

[57] ABSTRACT

A controlling method in a transporting machine such as airplane, automobile, etc. adapted to be obtainable a different friction resistance for a same running surface with an identical tire bringing its surface portion with a different friction coefficient in contact with the ground by means of changing an angle of a tire to a running ground surface.

5 Claims, 10 Drawing Figures

PATENTED OCT 16 1973

INVENTOR.
YASUO TSURUTA
BY Steinberg & Blake
attys 3,765,466

INVENTOR.
YASUO TSURUTA
BY Steinberg & Blake
attys

CONTROLLING METHOD IN A TRANSPORTING MACHINE SUCH AS AIRPLANE, AUTOMOBILE, ETC. AND ITS SYSTEM

SUMMARY OF THE INVENTION

This invention relates to a method in a transporting machine such as airplane, automobile, etc. and its system, and is to provide a controlling method of a tire maintaining a braking force in all possible road conditions where a transporting machine such as airplane, automobile, etc. getting in touch with the ground surface through its tires encounters and ensuring its stability at a time of a high-speed running.

BRIEF DESCRIPTION OF THE DRAWING:

The drawings show preferred embodiments of the invention.

DETAILED DESCRIPTION OF THE INVENTION

Since conventionally in an airplane or automobile the tread of a tire with a first object of resistanceless smooth running is combined in use with a second object of a braking effect, there often occurred such the cases that no braking force was sufficient in a tread more adapted in material for smooth running than for braking force which was causes of troubles of overrun and slipping.

Accordingly, in case of being liable to generate a hydroplaning phenomenon due to a puddle on the ground, there have been no positive counter-measure but extremely negative ones which it will run at a reduced speed, or a security of an airplane can only be secured by closing an air-port temporarily in case of existing ice or snow or a runway.

This invention is to make it possible for a transporting machine such as airplane or automobile (hereinafter merely called an automobile or airplane) to be controlled without any danger, whenever it suddenly encounters such ground surface, by obtaining a necessary friction resistance for a safe running of an automobile even on a very bad ground surface, e.g., frozen surface, since it is possible to make an automobile running by using, as a tread, a shoulder with a surface having so large friction coefficient, e.g., one planted with sharp spikes thereon, as to be unsuitable for running on a normal road surface by providing an operation of changing a ground-contacting angle of a tire during running to a control performance of a ground-holding transporting machine such as airplane or automobile.

Figure 1:
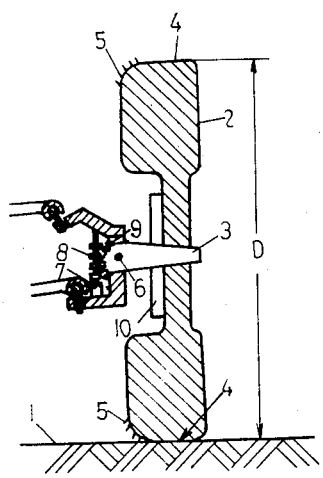
FIG. 1 is a sectional view showing an embodiment of the wheel retaining system of a transporting machine at a normal time.
Figure 2:
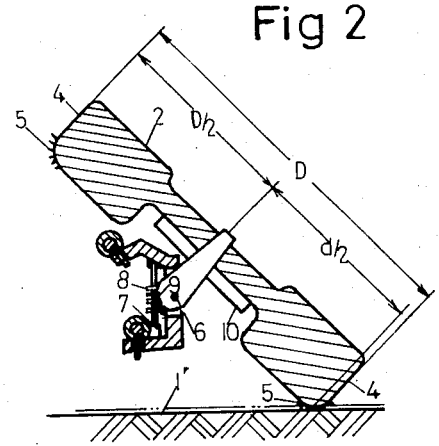
FIG. 2 is a sectional view of the wheel retaining system of FIG. 1 in operation.

Referring now to the figure in particular, as shown in FIG. 1, the tread of a tire 2 fixed to a wheel shaft 3 whose one end rotatable about a pin 6 is made into a worm wheel 9 is constituted principally of two parts, a conventional tread contacting with a running surface at a normal condition (hereinafter merely referred to as a normal tread) and a side tread 5 (hereinafter merely referred to as a side tread) contacting with a road surface 1' when a tire is slanted as shown in FIG. 2.

The side tread forms a curved surface and it is formed in such a manner that as the angle between side tread and normal tread becomes larger, a friction coefficient will also become larger (in FIGS. 1 and 2 a variation in largeness of a friction coefficient on the surface of side tread is shown with a variation in size of needle-like projections).

At a normal running, a shaft 3 is kept retained so that a normal tread 4 of a tire 2, as shown in FIG. 2, may get in touch with a running surface.

Figure 3:
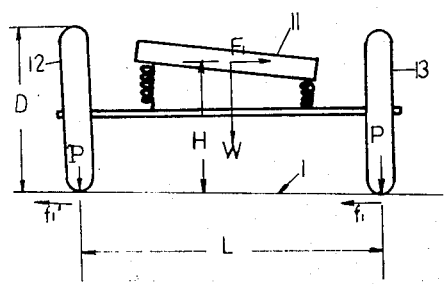
FIG. 3 is an illustrative view of a stress exerted to a pair of two wheels in a conventional automobile when turning.

Conventionally, when an automobile makes a turning motion, as shown in FIG. 3, as a centrifugal force $F_1$ exerts to body 11, so a load will move to a tire 13 on the outside of turning, while a load imposed upon a tire 12 on the inside of turning will be decreased, so that a friction resistance will also be decreased, then if its ratio goes to an extreme, then a resistance against side-slipping cannot bear a centrifugal force, as a consequence, only a tire 13 on the outside of turning will have to stand for the whole centrifugal force $F_1$.

While a ground-contacting pressure of an outside-turning tire 13 will be not to increase rapidly the instant an inside-turning tire 12 starts to slip, so often at this moment the latter cannot stand for the whole centrifugal force rapidly increased with a resistance against side-slipping exercised by an outside-turning tire 13, then an automobile will start to slip crosswisely.

When W is taken for a body weight to be imposed upon a pair of tires, L for a wheel tread, H for a height of center of gravity, $F_1$ for a centrifugal force bearable by a pair of two wheels, P for ground-contacting pressure of an inside-turning tire 12 and P for ground-contacting pressure of an outside-turning tire 13, then $$p = W/2 - F_1 \cdot H/L \quad P = W/2 + F_1 \cdot H/L$$

Accordingly, when taken for a friction coefficient for a running surface of treads in tires 12 and 13 as $\mu$, if $f_1'$ for a resistance against side-slipping of an inside-turning tire 12 and $f_1$ for a resistance against side-slipping of an outside-turning tire 13 will satisfy $$f_1' = \mu(W/2 - F_1 \cdot H/L) \geq F_1/2$$

(Formula 1)

$$f_1 = \mu(W/2 + F_1 \cdot H/L) > F_1/2$$

(Formula 2)

then an automobile can make a turning motion without sideslipping.

When a centrifugal force increases into $F_1 > \mu \cdot W \cdot L/(L + 2 \cdot \mu \cdot H)$ (Formula 1), a balance will be broken and an inside-turning tire 12 will begin to make a side-slipping, so that a resistance against side-slipping of an outside-turning tire 13 will be overcome by a centrifugal force, then an automobile can no longer stop its side-slipping.

The relationship among $8_2$, $W$, $F$, $H$ and $L$ the instant a friction resistance of inside-turning tire could not stand for a lateral force to be shared to it, $$F_1 = \mu \cdot L \cdot W/(L+2 \cdot \mu \cdot H)$$

(Formula 3)

and to avoid a side-slipping of an automobile resisting against a centrifugal force only with an outside-turning tire at this moment, it will have to satisfy $$f_1 = \mu[W/2 + \mu \cdot W \cdot H/(L+2 \cdot \mu \cdot H)] > F_1$$

(Formula 4)

in other words, $$\mu \cdot W(4\mu \cdot H + L)/2(L+2 \cdot \mu \cdot H) - F_1 > 0$$

(Formula 5)

where $\mu > 0$, $W > 0$, $H > 0$, so substitute Formula 3 into Formula 5, $$\mu \cdot W(4\mu \cdot H + L)/2(L + 2\mu \cdot H) - \mu \cdot L \cdot W/(L+2\mu \cdot H) > 0$$

$$4\mu \cdot H - L/2(L + 2\mu \cdot H) > 0$$

(Formula 6)

In formula 6, $2(L + 2\mu \cdot H) > 0$, so $$4\mu \cdot H - L > 0$$

(Formula 7)

$$4\mu > L/H$$

(Formula 8)

Unless it can satisfy Formula 8, when a friction resistance of an inside-turning tire 12 cannot stand for its shared centrifugal force, a side-slipping of an automobile cannot be avoided only by a resistance against a centrifugal force $F$ of an outside-turning tire 13.

However, a ratio between wheel tread $L$ of an automobile and its height of center of gravity $H$ is to be arranged in such a manner that a variation in wheel pressure between both left and right wheels due to a lateral force exerted to an automobile may be minimized and a resistance against a lateral force of an inside-turning wheel 12 can stand for a lateral force as large as possible, i.e., increase $F$ in Formula 3 as large as possible.

A ratio of $L/H$ in a normal automobile ranges in about 2.5, so in order to resist against a centrifugal force only with a friction resistance in an outside-turning tire, even if an inside-turning tire 12 can hardly stand for sharing a centrifugal force, it will require $\mu > 0.63$ from Formula 8.

A friction coefficient of a normal tread of a tire for a dried concrete or asphlt road surface is approximately 0.75, so a side-slipping of an automobile can be avoided only with a friction resistance against road surface of an outside-turning tire even after inside-turning tire lost a friction resistance against a lateral force, but an allowance for the case of further increasing a lateral force will be only about 0.12, and after having come to resist against a centrifugal force only with an outside-turning tire, an outside-turning tire will lose a friction resistance against a lateral force with a slight increase of a centrifugal force, thus an automobile will start a side-slipping.

When a road surface is wet, a friction resistance of a normal tread will become below 0.5, so that in case an inside-turning tire started to make a side-slipping, Formula 4 is no more available but an automobile will start a side-slipping.

In the automobile in accordance with the invention, when it makes a turning, an inside-turning tire 2 is slanted for a road surface 1 to bring a side tread with larger friction coefficient 5 in contact with the ground instead of a normal tread 4, as shown in FIG. 2, by rotating worm 8 by means of motor 7 to rotate wheel shaft 3 about pin 6 through a worm wheel 9 prepared at the end of shaft 3.

Figure 4:
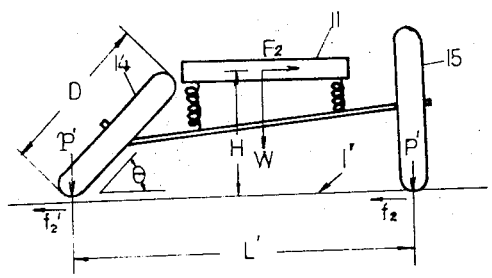
FIG. 4 is an illustrative view of a stress exerted to a pair of two wheels in an automobile in accordance with the invention when making a turning movement.

As shown in FIG. 4, when placing $W$ for a body weight to be imposed upon a pair of tires, $L$ for a wheel tread, $L'$ for a distance between ground-contacting points of tires 14 and 15 when an inside-turning tire is slanted, $H$ for a height of center of gravity, $H'$ for a height of center of gravity when an inside-turning tire is slanted, $\theta$ for a slanting angle of a tire 14 to a road surface 1, $F_1$ for a centrifugal force shared by a pair of tires 14 and 15, $P'$ for a ground-contacting pressure of an outside-turning tire 15 and $p'$ for a ground-contacting pressure of a slanted inside-turning tire 14, then it comes:

$$L' \approx L + D/2 \times \cos \theta$$

$$H' \approx H - D/4 \times (1 - \sin \theta)$$

$$p' = W/2 - F_2 [H - D(1 - \sin \theta)/4] / [L + D/2 \times \cos \theta]$$

$$P' = W/2 + F_2 [H - D(1 - \sin \theta)/4] / [L + D/2 \times \cos \theta]$$

and as compared with the case shown in FIG. 3 when a conventional automobile makes a turning motion, $$L < L + D/2 \times \cos \theta$$

$$H > H - D(1 - \sin \theta)/4$$

so if $F_1 = F_2$, then it becomes $$F_1 H/L > F_2 [H - D(1 - \sin \theta)/4] / [L + D/2 \times \cos \theta]$$

$$P > P', p > p'$$

which proves that, in case an automobile in accordance with the invention makes a turning motion, a variation in a ground-contacting pressure of an inside-turning tire generated by a centrifugal force is smaller as compared with in case of a conventional automobile, so that an inside-turning tire 14 can resist against a larger lateral force than an inside-turning tire 12 of a conventional automobile. Furthermore, a friction coefficient $\mu'$ against a road surface of a side tread can be prepared enough large, so a resistance against a lateral force of an inside-turning tire 14 increases, thus a stability of an automobile will become better.

When describing this matter by means of a formula, in case a resistance $f_2$ against a side-slipping of an outside-turning tire 15 in FIG. 4 and a resistance $f_2'$ against a side-slipping of an inside-turning tire 14 satisfy the following formula, $$f_2' = \mu'[W/2 - F\{H - D(1 - \sin \theta)/4\}/(L + D/2 \times \cos \theta)]F_2/2$$

(Formula 9)

$$f_2 = \mu[W/2 + F\{H - D(1 - \sin\theta)/4\}/(L + D/2 \times \cos\theta)]F_2/2$$

(Formula 10)

then an automobile in accordance with the invention can make a turning motion without a side-slipping.

When a centrifugal force $F_2$ increases into $$F_2 > \mu'W(2L + D\cos\theta)/(2L + D\cos\theta + 4\mu'H - D\mu' + D\mu'\sin\theta)$$

(Formula 12)

a balance in Formula 9 is broken, then inside-turning tire 14 starts to make a side-slipping, thus the whole centrifugal force $F_2$ will be imposed upon an outside-turning tire.

As an automobile in accordance with the invention is compared with a conventional one in regard to a critical centrifugal force resistable with a pair of two wheels, $$F_2/F_1 = \mu'/\mu \times (2L^2 + DL\cos\theta + 4\mu HL + 2\mu DH\cos\theta)/(2L^2 + DL\cos\theta + 4\mu'HL - \mu'DL + \mu'DL\sin\theta)$$

(Formula 11)

Assuming that $\mu' = \mu$ in Formula 11, $F_2/F_1 > 0$ (Note: In this point, as already mentioned, in case an automobile in accordance with the invention makes a turning motion, a variation in a ground-contacting pressure of an inside-turning tire generated by a centrifugal force is smaller as compared with in case of a conventional automobile, so that an inside-turning tire 14 can resist against a larger lateral force than an inside-turning tire 12 of a conventional automobile) and if $\mu' > \mu$ (regardless of values of $H$, $L$, $D$, $\theta$), then its ratio will increase more, so a stability of an automobile in accordance with the invention will become better.

A side tread, different from a normal tread always getting in contact with a running surface, can be selected and worked its surface as desired, so that it is possible to increase its friction coefficient extremely and also to vary its surface partially, and further to change an inclination of a tire according to a centrifugal force exerted to an automobile to induce different friction resistances in strength from a same tire. As a side tread is not to be used at a normal running, so its frequency in use is very low as compared with a normal tread, accordingly without following up a friction-resistant property as in the case with a normal tread, it can stand for a long-run service.

Furthermore, as an effective rotating diameter $d$ of a slanted inside-turning tire is, as shown in FIG. 2, smaller than that D of a tire getting in contact with the ground with a normal tread, so it will result in promoting an effect of a turning motion in case an automobile in accordance with the invention, as illustrated in FIG. 4, makes a turning motion according to a difference between effective rotating diameters of an inside-turning tire 14 and outside-turning tire 15.

An effect of the invention can be more increased by arranging to change an angle $\theta$ between tire 2 or 14 in accordance with the invention shown in FIGS. 2 and 4 and running surface 1' according to an operating volume of a handle equipped on an automobile in accordance with the invention or further by controlling it by means of an electronics such as a computer detecting a condition on a running surface 1 or a generated centrifugal force.

The invention is very much effective to control an automobile safely by obtaining a necessary friction in not only making a turning motion but also running on an extremely slippery (e.g., frozen surface, etc.) road surface.

Figure 5:
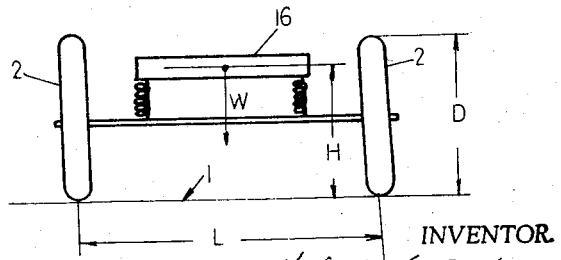
FIG. 5 is an illustrative view of dimensions in arrangement of a pair of two wheels at a time of normal running by an automobile.
Figure 6:
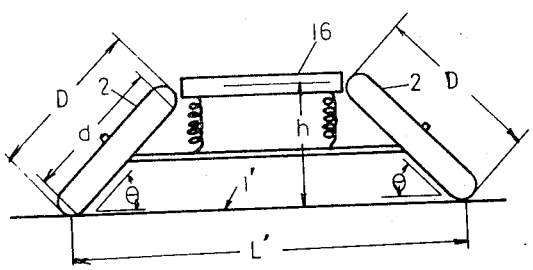
FIG. 6 is an illustrative view for dimensions in arrangement of a pair of two wheels to which the procedures of the invention are applied.

Referring now to this embodiment through figures, where an automobile in accordance with the invention encounters an extremely slippery road surface (for instance, frozen road surface, etc., hereinafter merely called a frozen road surface), if an automobile is operated by shifting both side tires 2 shown in FIG. 6 by means of such manipulation as described in FIG. 2 from a running condition on a normal road surface 1 as shown in FIG. 5 to a slanted position of both-side tires 2 to a running surface 1' as shown in FIG. 6, thus inducing a spike-planted side tread to be a ground-contacting surface as shown in FIG. 2, then the spikes planted on a side tread 5 will bite the ice on a road surface 1' to obtain a necessary friction resistance from a frozen road surface 1' and, as a consequence, an automobile in accordance with the invention can run safely. Simultaneously, as an effective rotating diameter removes from $D$ to $d$ ($D > d$) as shown in FIGS. 2 and 6, so not only a driving power, engine power and braking force in tire 2 will be strengthened, but also a height of center of gravity H in a body 16 in FIG. 5 is lowered in $h = H - D(1 - \sin\theta)/2$, as shown in FIG. 6, besides a wheel tread L is widened in $L'' = L + D\cos\theta$, so that a stability of a body 16 will become so much better.

If a surface of a side tread 5 is designed so as to increase a friction coefficient gradually toward the inside of a body, a different friction coefficient for a same running surface can be obtained corresponding to its necessity by means of changing a slant angle $\theta$ of a tire 2 according to a condition of a road surface. For instance, in case of such extent that there is just a puddle on a running surface, running can be done with a slight slanting of a tire to obtain a necessary friction resistance by short spikes penetrating through water film then contacting a running surface, while in case a running surface is frozen, a necessary resistance can be obtained by preparing a slant of a tire larger to bring longer-spike planted portion of a side tread in contact with the ground and to force long sharp spikes to bite the ice.

When a road condition becomes better (such as on a dried concrete surface), as shown in FIG. 1, an automobile can be run with a normal tread keeping in contact with a road surface 1 by first rotating worm 8 in the reverse direction by means of motor 7, then by rotating a wheel shaft 3 through a rotation of a worm wheel 9 to raise tire 2 up.

Figure 7:
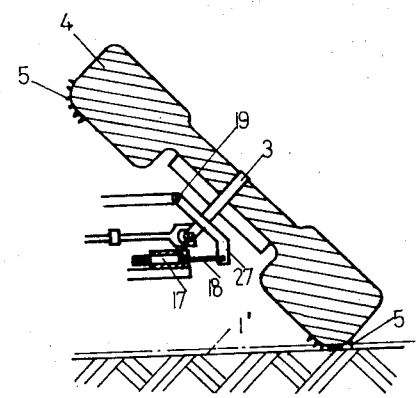
FIG. 7 is a sectional view of the wheel retaining system in operation in driving wheels of a transporting machine in accordance with the invention.

FIG. 7 shows an embodiment of the system in case of taking advantage of the invention into a driving wheel. In this illustration, a slant of a tire 2 can be changed by a wheel shaft 3 to be inclined according to a rotation of a spindle supporter 27 rotating about a pin 19 by an extrusion or intrusion of piston rod 18 of piston 17.

Figure 8:
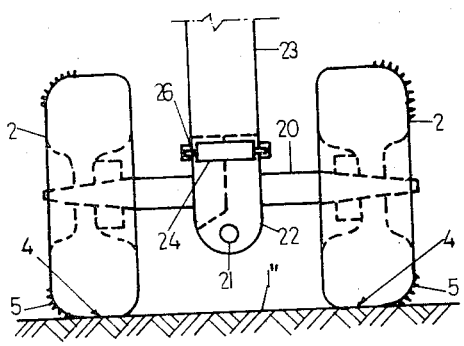
FIGS. 8 to 10 are illustrative views showing an operating condition in the tire slanting mechanism to which the invention is applied when an airplane is landing.
Figure 9:
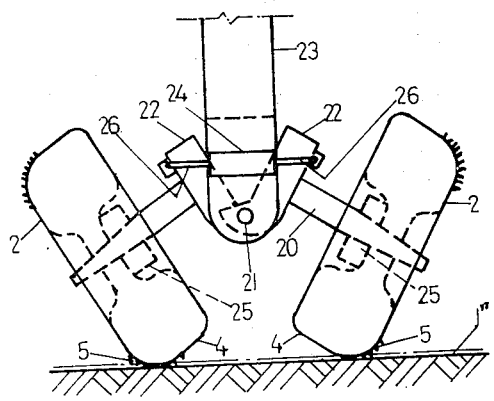
Figure 10:
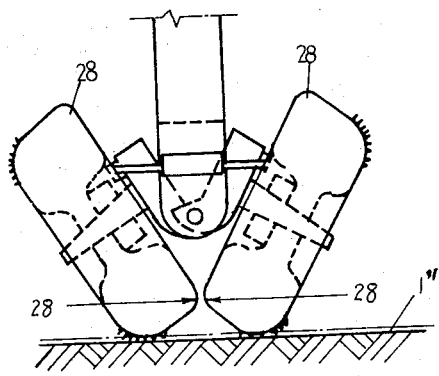

Further, FIGS. 8 to 10 show an embodiment of a tire slanting mechanism adapting the invention to an airplane when it lands.

In this illustration, wheel shaft 20 is supported by a shaft supporting arm 22 rotating about a pin 21.

A strong shock at a moment of an airplane landing, as shown in FIG. 8, is transferred from a shaft supporting arm 22 to an adjacent undercarriage column 23. In case a condition on a runway surface 1'' is slippery (e.g. frozen condition) and it cannot obtain an enough braking force only with a normal tread 4 of a tire 2, as shown in FIG. 9, by protruding rod 26 of jack 24, rotating shaft supporting arm 22 about pin 21, slanting tire 2 to a runway surface 1'', bringing a side tread 5 in contact with the ground and controlling a rotation of a tire 2 by brake 25 after biting its spikes into the ice on a runway surface 1'', a power of breaking down the ice on a runway surface 1'' can be used as a braking force.

When a runway condition becomes better during running, withdraw a rod 26 of a jack 24, raise tire 2 up as shown in FIG. 8 and bring a normal tread 4 in contact with the ground to avoid a useless friction on a side tread.

FIG. 10 shows a means of avoiding a noxious strain to impose upon a tire by offsetting noxious forces exerting to left and right tires in such a manner that, as a means of avoiding a strain on a tire occurred due to a variation in a direction of a force imposed upon a tire when tire 2 is slanted to a runway 1'', both shoulders of a pair of left and right tires are brought in contact with each other.

I claim:

1. In a vehicle, a wheel having an axis of rotation which normally extends horizontally during normal travel of the vehicle, said wheel having an outer road-engaging peripheral surface of a predetermined width in a direction parallel to the wheel axis which normally engages the road surface during normal travel of the vehicle when said wheel axis is substantially horizontal, said wheel having a region of maximum width greater than the width of said road-engaging surface situated adjacent but spaced from said road-engaging surface, and said wheel having peripheral side surfaces which are convexly curved and merge into said road-engaging surface and said region of maximum width, at least one of said side surfaces carrying a means for increasing the friction between said wheel and a road when said one side surface engages the road, said means for increasing the frictional engagement between said wheel and road being limited only to said one side surface, and tilting means operatively connected with said wheel for tilting the latter to incline said axis thereof in a direction which places said one side surface in engagement with the road to increase the frictional engagement between the wheel and road.

2. The combination of claim 1 and wherein the vehicle is a vehicle such as an automobile which is intended to travel only on a supporting road, said wheel having an outer side directed outwardly away from the vehicle and an opposed inner side, and said one surface being located at the inner side of the wheel while said tilting means coacts with said wheel for tilting the latter between a normal position in a substantially vertical plane and an inclined position where said one surface is displaced at its lower end which engages the road outwardly away from an opposed wheel of the vehicle to increase the distance between said wheels and lower the vehicle when said wheel is tilted to place said one surface in engagement with the road.

3. The combination of claim 2 and wherein said opposed wheel is identical with the first-mentioned wheel and is a mirror image of the latter, said tilting means being operatively connected with both of said wheels for simultaneously tilting the latter between positions where both wheels are respectively in substantially parallel vertical planes to positions where the lower portions of said inside surfaces engage the road and are situated from each other by a distance greater than when said wheels are in said vertical planes.

4. The combination of claim 1 and wherein the vehicle is an airplane which engages a road during take-off and landing and during taxiing, said wheel forming one of a pair of wheels carried by an undercarriage column of the airplane, and said pair of wheels normally having a common axis of rotation, said side surface of each of said wheels which carries said friction-increasing means being situated at the outer side of each wheel, and said tilting means being carried by said column and being operatively connected with said wheels for tilting the latter simultaneously in opposite directions which displace said outer side surfaces toward each other at their lower regions in order to engage the road.

5. The combination of claim 4 and wherein said wheels are located close enough to each other to directly engage each other after said tilting means tilts said wheels through a given angle so that said wheels reinforce each other when said outer side surfaces thereof engage the road.

* * * * *